United States Patent [19]
Wakamoto

[11] Patent Number: 5,810,598
[45] Date of Patent: *Sep. 22, 1998

[54] VIDEO LEARNING SYSTEM AND METHOD

[76] Inventor: Carl Isamu Wakamoto, Caption Center Japan, Akasaka House, 4th Floor, 7-5-40 Akasaka, Minato-ku, Tokyo 107, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 821,889

[22] Filed: Mar. 21, 1997

Related U.S. Application Data

[63] Continuation of Ser. No. 327,510, Oct. 21, 1994, abandoned.
[51] Int. Cl.[6] ................................................. G09B 19/00
[52] U.S. Cl. ................ 434/156; 434/185; 434/307 R; 348/473; 348/564; 360/69; 386/39
[58] Field of Search .................................. 434/118, 156, 434/157, 169, 185, 307 R, 307 A, 308, 309, 318, 323, 362, 365; 348/10–12, 61, 468, 473, 478, 486, 488, 563, 564, 571; 345/302, 435; 386/39; 360/13, 32, 33.01, 49.7, 61, 69, 70, 77.01; 381/51; 369/2, 48, 178, 192; 455/2, 6.2, 174.1, 295; 84/477 R, 601, 603, 609, 610, 625, 630, 631, 634, 645

[56] References Cited

U.S. PATENT DOCUMENTS

| | | | |
|---|---|---|---|
| 3,955,466 | 5/1976 | Goldmark | 434/319 X |
| 4,748,501 | 5/1988 | Long | 348/11 |
| 4,847,698 | 7/1989 | Freeman | 434/307 R X |
| 5,341,253 | 8/1994 | Liao et al. | 360/61 |
| 5,433,609 | 7/1995 | Deaver et al. | 434/157 X |

FOREIGN PATENT DOCUMENTS

| | | | |
|---|---|---|---|
| 5-46070 | 2/1993 | Japan | 434/307 A |

*Primary Examiner*—Joe Cheng
*Attorney, Agent, or Firm*—Merchant, Gould, Smith, Edell, Welter & Schmidt

[57] ABSTRACT

A language learning system comprises a video recording and playing system for playing a recording media, such as a VCR tape, which records a first voice signal of a first speaker and a second voice signal of a second speaker. The video recording and playing system has a first channel and a second channel which are exclusively responsive to the first voice signal and the second voice signal, respectively. A channel selecting device selects at least one of the first voice channel and the second voice channel so that at least one of the first voice signal and the second voice signal is reproduced. As a result, the user can practice conversation with the selected speaker in place of the non-selected speaker.

17 Claims, 5 Drawing Sheets

VIDEO LEARNING SYSTEM AND METHOD

This is a continuation of application Ser. No. 08/327,510 filed Oct. 21, 1994 now abandoned.

BACKGROUND OF THE INVENTION

1. Field of the Invention

The present invention relates to a learning system employing video equipment and, in particular embodiments, to a system for learning a second language (such as English).

2. Description of Related Art

Recently, various systems for learning languages have become popular. Traditionally, languages were learned in a conventional classroom environment with a live instructor. However, more recently, private learning systems are gaining popularity. In this connection, recording and playing equipment, such as video cassette recorders (VCRs), are often used for learning languages by many people. In particular, VCRs have several advantages in learning languages because they can provide audiovisual aids which may be enhanced with video pictures. However, when a learner uses the VCR equipment for learning languages, in many cases, he only watches a video picture and listens to conversations in the video picture. Such a "passive" learning method may not be enjoyable or effective in learning languages.

SUMMARY OF THE INVENTION

It is an object of embodiments of the present invention to provide a learning system using an ordinary video recording and playing equipment, such as video cassette recorders (VCRs), Laser Disc players, Compact Disc players and CD-ROMs.

It is another object of embodiments of the present invention to provide a learning system for learning languages using an ordinary video recording and playing equipment.

This is achieved by, in accordance with one embodiment of the present invention, a learning system comprising a novel channel selecting device used with, for example, a VCR system for playing a magnetic tape and a stereo audio system coupled to the VCR system. The magnetic tape records an image signal and a stereo audio signal which includes at least a first voice signal and a second voice signal. The audio system has a first voice channel and a second voice channel which are exclusively responsive to the first voice signal and the second voice signal, respectively. The channel selecting device selects at least one of the first voice channel and the second voice channel so that at least one of the first voice signal and the second voice signal is reproduced. In another embodiment, the switching device selects at least one of the first voice channel and the second voice channel so that at least one of the first voice signal and the second voice signal is not reproduced. In accordance with one embodiment of the present invention, when the magnetic tape records a conversation between a first role and a second role representative of the first voice signal and the second voice signal, respectively. One of the first and second voice signals may be selected to play corresponding one of the first and second roles, while the other may be muted. As a result, the user can practice conversation with the selected role in place of the non-selected role.

DETAILED DESCRIPTION OF EMBODIMENTS

Figure 1:
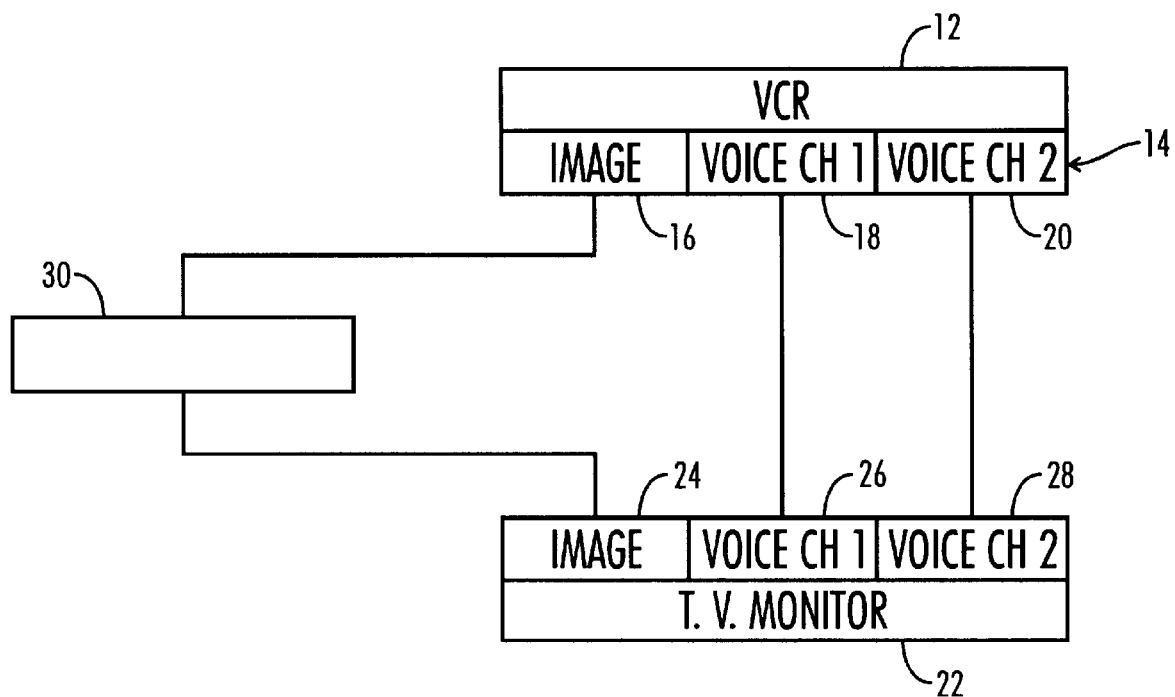
FIG. 1 illustratively shows an audiovisual system having a video cassette recorder (VCR) and a TV monitor which are used for a language learning system in accordance with one embodiment of the present invention.

An audiovisual system to be used for a language learning system in accordance with one embodiment of the present invention is generally indicated at numeral 10. Typically, the audiovisual system 10 includes a video cassette recorder (VCR) 12 for playing a video tape 14. In one embodiment, the video tape 14 records an image signal 16, a first sound for channel CH 1 and a second sound for channel CH 2. The audiovisual system 10 also includes a TV monitor system 22. The TV monitor system 22 has a TV monitor 24, a first sound generating device 26 for generating the first recorded sound at CH 1 and a second sound generating device 28 for generating the second recorded sound at CH 2. To selectively generate recorded sound at the channel CH 1 and the channel CH 2, both VCR and TV monitor system 22 are equipped with a Hi-Fi stereo system. A caption generating device 30 is provided between the VCR 12 and the TV monitor system 22 to generate a caption recorded in the video tape 14.

Figure 2:
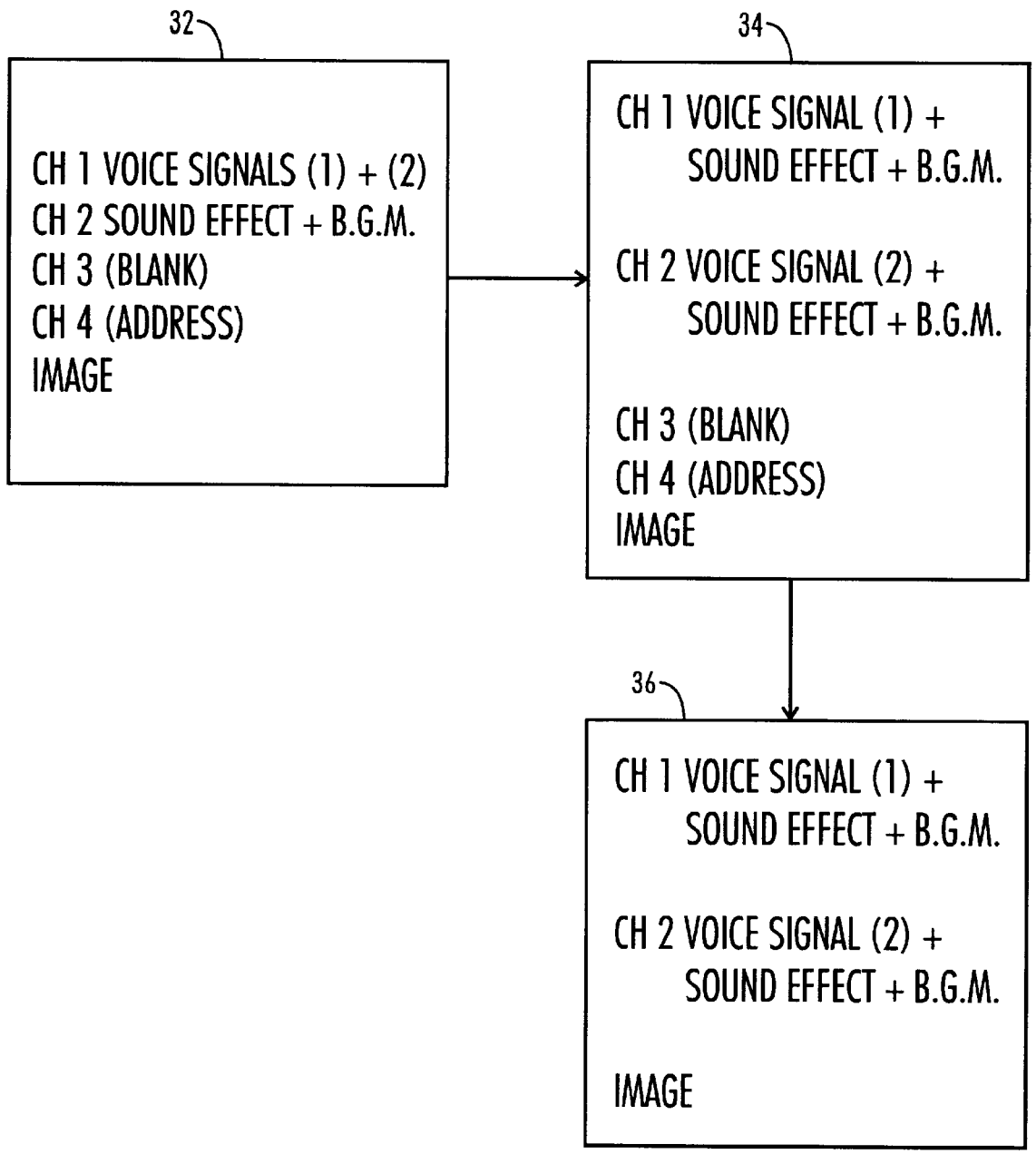
FIG. 2 is an explanatory illustration of editing a recording tape used for a language learning system.

Referring to FIG. 2, in accordance with one embodiment of the present invention, the video tape 14 is prepared in a manner described herein below.

A master video tape 32, such as, for example, a one inch width tape which may be widely used in broadcasting stations, is used. For example, the master video tape 32 records audio signals at four tracks for four voice channels CH 1, CH 2, CH 3 and CH 4 and an image signal at an image recording track. The master video tape 32 records a first voice signal (1) and a second voice signal (2) at channel CH 1, and sound effect and a background music at channel CH 2. Channel CH 3 may be blanked so that the user can record a desired sound or voice signal. Channel 4 may be used for storing address signals.

The master tape 32 having the above mentioned signals may be edited in a manner described below. First, the voice signal (1) and the voice signal (2) are separated. The voice signal (1) is mixed with the sound effect and the background music and recorded at channel CH 1 of a second video tape 34. The voice signal (2) is mixed with the sound effect and the background music and recorded at channel CH 2 of the second video tape 34. Therefore, both channel CH 1 and channel CH 2 of the second video tape 43 record the same sound effect and background music. For learning languages, the first voice signal (1) and the second voice signal (2) are recorded respectively at channel CH 1 and channel CH 2 on a commercially available tape 36, such as, for example, a half inch VHS tape, Beta system tape and 8 mm VCR tape. The image signal is recorded in an appropriate image recording track of the tape 36.

Figure 3:
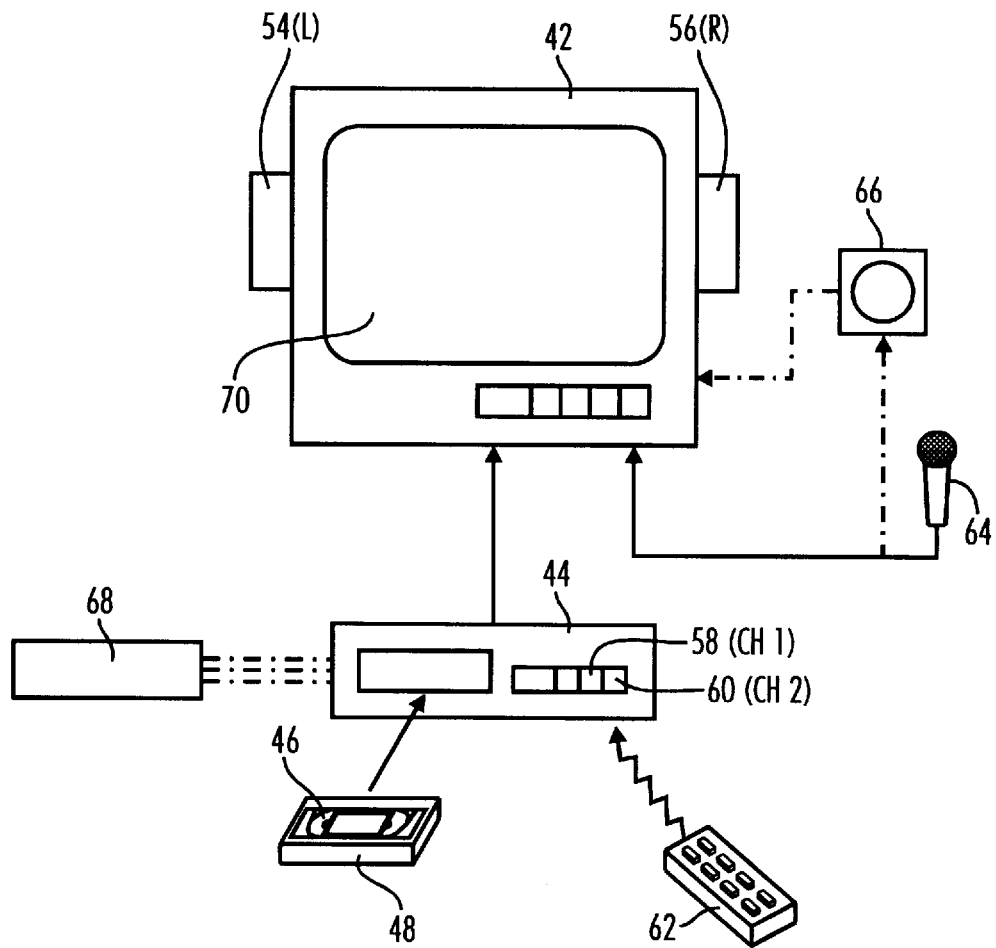
FIG. 3 shows an overall configuration of a language learning system coupled to a VCR and a TV monitor having an audio system in accordance with one embodiment of the present invention.

Referring to FIG. 3, an overall language learning system in accordance with one embodiment of the present invention is generally indicated at 40. The language learning system 40 includes a TV monitor system 42, a VCR 44 coupled to the TV monitor system 42 and a video tape 46. The video tape 46 records, for example, voice signal and image signal of a language learning program, in a similar manner as sound and image signals are recorded in the tape 36 as described above. For example, the video tape 46 records a first voice signal of a first speaker with sound effect and background music at channel CH 1, a second voice signal of a second speaker with the same sound effect and background music at channel CH 2 and a video image signal at an image recording channel. The video tape 46 may be stored in a tape cassette 48. The TV monitor system 42 is provided with a left loudspeaker 54 and a right loudspeaker 56.

The VCR 44 is provided with a switch 58 for channel CH 1 and a switch 60 for channel CH 2. Switches 58 and 60 are manually and externally controllable. The channel CH 1 associates with the left loudspeaker 54 and the channel CH 2 associates with the right loudspeaker 56. Therefore, for example, when the switch 58 is activated while the video tape 46 is being replayed, only the audio signal recorded at channel CH 1 (for example, including a first voice of the first speaker, sound effect and background music) are reproduced by the left loudspeaker 54. On the other hand, when the switch 60 is activated, only the audio signal recorded at channel CH 2 (for example, including a second voice of the second speaker, sound effect and background music) is reproduced by the right loudspeaker 56. When both of the switches 58 and 60 are activated, audio signals recorded at channel CH 1 and channel CH 2 are reproduced by both loudspeakers 54 and 56. In a preferred embodiment, both the VCR 44 and the TV monitor system 42 are of Hi-Fi stereo system to selectively reproduce the recorded audio signals at channels CH 1 and CH 2. In one embodiment, the switches 58 and 60 may be activated by a remote controller 62.

The TV monitor system 42 may include a microphone 64 which is coupled to TV monitor system so that the user can hear his own speech from the loudspeakers 54 and 56. Optionally, a separate loudspeaker 66 may be coupled to the microphone 64 and the TV monitor system 42 as shown in a phantom line.

In one embodiment, when a caption is not recorded on the VCR tape 46, a caption generating system 68 may be optionally coupled to the VCR 44 to provide a caption in a video picture displayed on a TV monitor 70 of the TV monitor system 42. However, when a caption is already recorded on the VCR tape 46, such a caption generating system is not required because the caption is provided by the caption generating device 30.

In operation, the language learning system 40 is used in a manner described below in one preferred embodiment of the present invention.

Figure 4A:
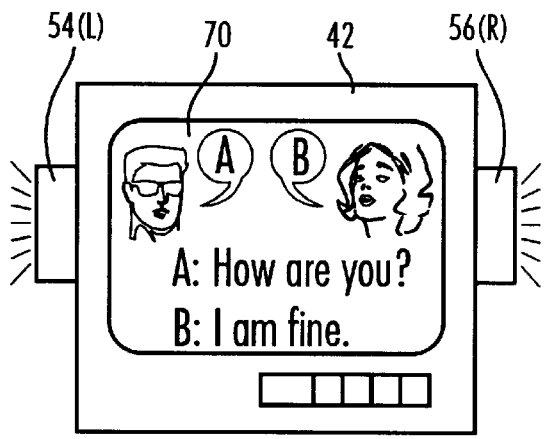
FIGS. 4(a)–4(c) are explanatory illustrations of practicing a foreign language conversation using a language learning system shown in FIG. 2.
Figure 4B:
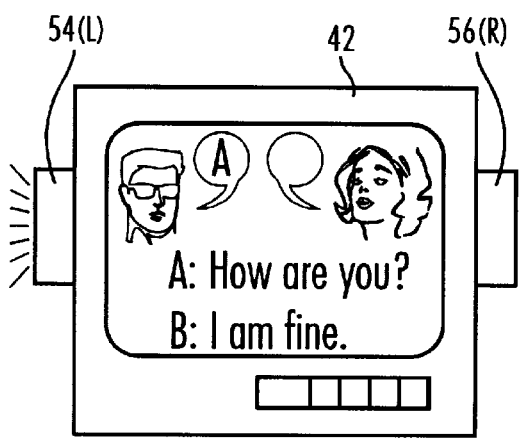
Figure 4C:
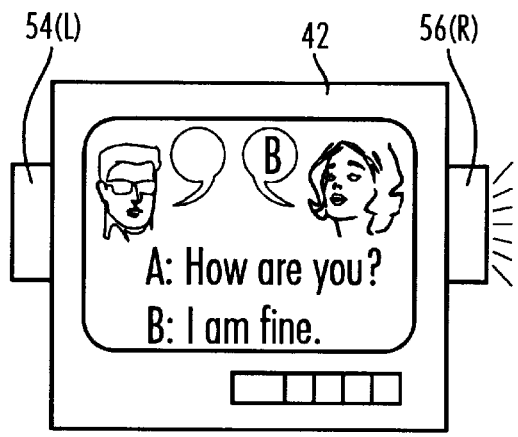

As shown in FIG. 4(*a*), both of the switches 58 and 60 are activated so that both speeches of first and second speakers A and B are generated by the left loudspeaker 54 and the right loudspeaker 56, respectively. In this case, for example, the speech of the first speaker A is heard from the left loudspeaker 54 and the speech of the second speaker B is heard from the right loudspeaker 56. As shown in FIG. 4(*a*), both speeches of the speakers A and B may optionally be captioned and displayed on the TV monitor 70 in synchronism with the video image displayed on the TV monitor 70.

One of the switches 58 and 60 on the VCR 44 may be activated to generate only one of the speeches of the speakers A and B. For example, when the switch 58, which associates with channel CH 1 and the left loudspeaker 54, is activated, while the switch 60 is inactivated, only the speech of the first speaker A is heard from the left loudspeaker 54, as shown in FIG. 4(*b*). However, the speech of the second speaker B is not heard from the right loudspeaker 56. This feature allows the user (learner) to speak in place of the second speaker B in response to the speech of the first speaker A. The user may read the caption to assist his speech practice. At any time during this role play, the user may activate the switch 60 to play the speech of the second speaker B, so that the user may repeat the speech of the speaker B which is heard from the right loudspeaker 56. On the other hand, when the switch 60, which associates with channel CH 2 and the right loudspeaker 56, is activated, while the switch 58 is inactivated, only the speech of the second speaker B is heard from the right loudspeaker 56, as shown in FIG. 4(*c*). However, the speech of the first speaker A is not heard from the left loudspeaker 54. The user can practice speech in place of the first speaker A in response to the speech of the second speaker B.

During the speech practice as described above, the sound effects and the background music recorded on the VCR tape 46 may be reproduced and heard from both loudspeakers 54 and 56 without regard to the selection of the channels CH 1 and CH 2.

As described above, the language learning system 40 mutes either or both of the speeches of the speakers A and B to thereby allow the user to practice a role play. The user is also assisted by the caption during practicing the conversation of the speakers A and B. Learning efficiency is further enhanced by the video image provided by the VCR system, and by the user's own voice generated by the microphone 64 and heard from the speakers 54 and 56.

Figure 5:
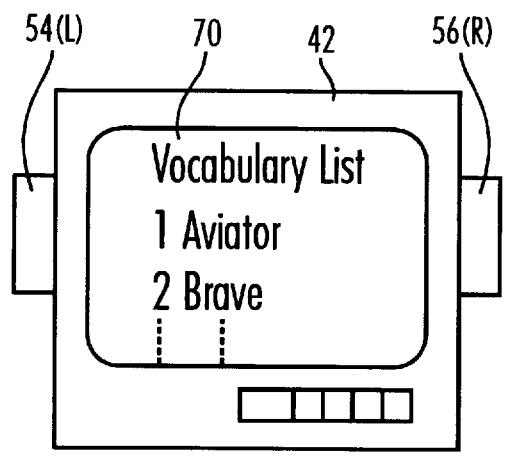
FIG. 5 is an explanatory illustration of a TV monitor with text data being displayed.

As shown in FIG. 5, the TV monitor displays a list of vocabulary which may be used in a dialogue. Such a vocabulary list may be recorded on the VCR tape 46 and may be displayed after a preceding dialogue is finished and before a following dialogue is started.

In accordance with one embodiment of the present invention, an indication may be provided for indicating the timing when speech in a language learning program is muted. For example, an indication may be displayed on the TV monitor 70 to show one of the speakers A and B starts speaking when both of the speeches by the speakers A and B are muted. In response to the indication, the user can start speaking the part of the speech which is indicated by the indication.

In accordance with another embodiment of the present invention, a computer learning program may be used to automatically control the selection of the switches 58 and 60 which are programmed in synchronism with a language learning program replayed on the VCR system 44. Such a learning program may also control the operation of the VCR system 44, such as, for example, replaying, stopping and rewinding of the VCR system 44 according to a programmed procedure. In this case, a personal computer (not shown) may be connected to the VCR system 44 to run the computer learning program.

It is seen from the above that the present invention provides a unique language learning system which provides more realistic language learning environments using an audiovisual system, such as, a Hi-Fi stereo VCR system.

It will, of course, be understood that modifications of the present invention, in its various aspects will be apparent to those skilled in the art, some being apparent only after study and others being matters of routine mechanical design. For example, although the embodiment described above is directed to replaying speeches of speakers in a language learning program, other voices and sounds may be used for a different program. For example, a duet (a musical piece for two of the same musical instruments) may be practiced in a manner similar to the procedure described above. Furthermore, a tape may have three or more channels. For example, such a tape may record a first voice signal representing a song sung by a professional singer at channel CH 1, a second voice signal at channel CH 2, and a background music and sound effects at channel CH 3. When channel CH 1 is not selected so that the singer's song is muted, the user can sing along the background music recorded at channel CH 3. Still further, with respect to the tape having three channels, channels CH 1 and CH 2 or channels CH 2 and CH 3 may be selected. Other embodiments are also possible, with their specific designs depending upon the particular application. As such, the scope of the invention should not be limited by the particular embodiment herein described but should be defined only by the appended claims and equivalents thereof.

What is claimed is:

1. A user-operated conversation learning system comprising:

a recording medium on which a first voice signal for a first audio channel, a second voice signal for a second audio channel and a video image signal associated with the first and second voice signals are recorded;

a multi-channel audio and video signal reproducing device having at least first and second audio channels, said device including means for reading signals recorded on the recording medium and producing the video image signal, a first audio signal on the first audio channel and a second audio signal on the second audio channel, wherein the first audio signal includes the first voice signal but not the second voice signal, and the second audio signal includes the second voice signal but not the first voice signal;

a display device operatively coupled to receive the video image signal and display images corresponding to the video image signal;

a speaker system operatively coupled to receive the first and second audio signals on the first and second audio channels and produce sound corresponding to the first and second voice signals;

a manual channel deactivation switch operatively coupled to selectively deactivate at least one of the first and second audio channel for selectively inhibiting the speaker system from producing sound corresponding to at least one of the first and second voice signals;

wherein upon deactivation of one of the audio channels, the user may orate sound corresponding to the voice signal for the deactivated audio channel.

2. A system as recited in claim 1, wherein the recording medium comprises a multi-track recording medium having at least first and second audio tracks, wherein the first voice signal but not the second voice signal is recorded on the first audio track and the second voice signal but not the first voice signal is recorded on the second audio track.

3. A system as recited in claim 1, wherein a background audio signal is recorded with the first voice signal on the first audio track and a corresponding background audio signal is recorded with the second voice signal on the second audio track.

4. A system as recited in claim 1, wherein said manual channel deactivation switch includes means for deactivating either one or both of the first and second audio channels.

5. A system as recited in claim 1, further comprising a microphone for receiving an audible signal from the user and providing a microphone voice signal corresponding to the received audible signal, the speaker system being operatively coupled to the microphone for producing sound corresponding to the microphone voice signal.

6. A system as recited in claim 5, wherein the speaker system includes a first speaker operatively coupled to receive the first audio signal but not the second audio signal, a second speaker operatively coupled to receive the second audio signal but not the first audio signal, and a third speaker operatively coupled to receive the microphone voice signal.

7. A system as recited in claim 1, wherein the speaker system includes a first speaker operatively coupled to receive the first audio signal but not the second audio signal, and a second speaker operatively coupled to receive the second audio signal but not the first audio signal.

8. A system as recited in claim 1, further comprising a caption generating device operatively coupled to the audio and video signal reproducing device and to the display device for generating a caption signal corresponding to a video image of written text associated with at least one of the first and second voice signals and for providing the generated caption signal to the display device for displaying an image corresponding to said written text.

9. A method of learning a conversation between first and second speaking characters, the method comprising the steps of:

providing a recording medium on which a first voice signal corresponding to a first speaking character's voice in a conversation is recorded for a first audio channel, a second voice signal corresponding to a second speaking character's voice in the conversation is recorded for a second audio channel and a video image signal corresponding to images of the conversation between the first and second speaking characters is recorded for a video channel;

reading signals recorded on the recording medium with a multi-channel audio and video signal reproducing device and producing the video image signal on a video channel, a first audio signal on a first audio channel and a second audio signal on the second audio channel, wherein the first audio signal includes the first voice signal but not the second voice signal, and the second audio signal includes the second voice signal but not the first voice signal;

displaying images corresponding to the video image signal on a display device operatively coupled to the audio and video signal reproducing device;

providing a speaker system operably coupled to the audio and video signal reproducing device, to produce sound corresponding to the first and second voice signals;

manually deactivating at least one of the first and second audio channels for selectively inhibiting sound corresponding to at least one of the first and second voice signals from being produced by the speaker system, to suppress at least one of the first and second speaking character's voice in the conversation;

wherein upon deactivation of one of the audio channels, the user may orate sound corresponding to the speaking character's voice for the deactivated audio channel, while viewing the video images corresponding to the conversation between the first and second speaking characters.

10. A method as recited in claim 9, wherein the recording medium comprises a multi-track recording medium having at least first and second audio tracks, wherein the first voice signal but not the second voice signal is recorded on the first audio track and the second voice signal but not the first voice signal is recorded on the second audio track.

11. A method as recited in claim 9, wherein a background audio signal is recorded with the first voice signal on the first audio track and a corresponding background audio signal is recorded with the second voice signal on the second audio track.

12. A method as recited in claim 9, further comprising the steps of:
  receiving an audible signal from the user in a microphone and providing a microphone voice signal corresponding to the received audible signal; and
  operatively coupling the speaker system to the microphone for producing sound corresponding to the microphone voice signal.

13. A method as recited in claim 9, further comprising the step of generating a caption signal with a caption generating device operatively coupled to the audio and video signal reproducing device and to the display device, the caption signal corresponding to a video image of written text associated with at least one of the first and second voice signals and for providing the generated caption signal to the display device for displaying an image corresponding to said written text.

14. A method of making a user-operated conversation learning method comprising the steps of:
  recording first and second voice signals on first and second respective audio tracks of a multi-track recording medium, wherein the first voice signal but not the second voice signal is recorded on the first audio track and the second voice signal but not the first voice signal is recorded on the second audio track;
  recording a video image signal on a video track of the multi-track recording medium;
  coupling a multi-channel audio and video signal reproducing device to read signals recorded on the recording medium and produce the video image signal, a first audio signal on the first audio channel and a second audio signal on the second audio channel, wherein the first audio signal includes the first voice signal but not the second voice signal, and the second audio signal includes the second voice signal but not the first voice signal;
  coupling a display device to the audio and video signal reproducing device for displaying images corresponding to the video image signal;
  coupling a speaker system operably to the audio and video signal reproducing device, to produce sound corresponding to the first and second voice signals;
  coupling a manual switch for manually deactivating at least one of the first and second audio channels for selectively inhibiting sound corresponding to at least one of the first and second voice signals from being produced by the speaker system;
  wherein upon deactivation of one of the audio channels, the user may orate sound corresponding to the voice signal for the deactivated audio channel.

15. A method as recited in claim 14, wherein a background audio signal is recorded with the first voice signal on the first audio track and a corresponding background audio signal is recorded with the second voice signal on the second audio track.

16. A method as recited in claim 14, further comprising the steps of:
  receiving an audible signal from the user in a microphone and providing a microphone voice signal corresponding to the received audible signal; and
  operatively coupling the speaker system to the microphone for producing sound corresponding to the microphone voice signal.

17. A method as recited in claim 14, further comprising the step of generating a caption signal with a caption generating device operatively coupled to the audio and video signal reproducing device and to the display device, the caption signal corresponding to a video image of written text associated with at least one of the first and second voice signals and for providing the generated caption signal to the display device for displaying an image corresponding to said written text.

* * * * *